April 28, 1931.                G. E. CASSIDY                1,803,170
                                CONTROL SYSTEM
                               Filed June 20, 1928
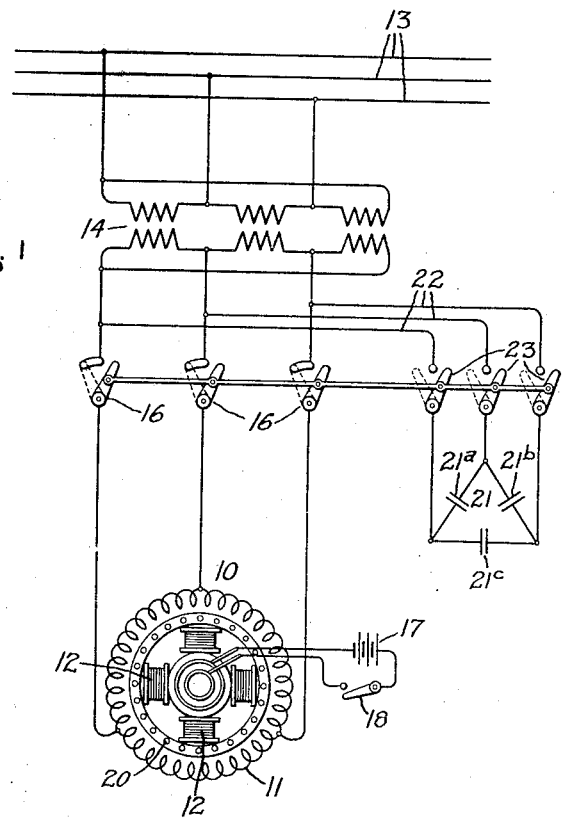
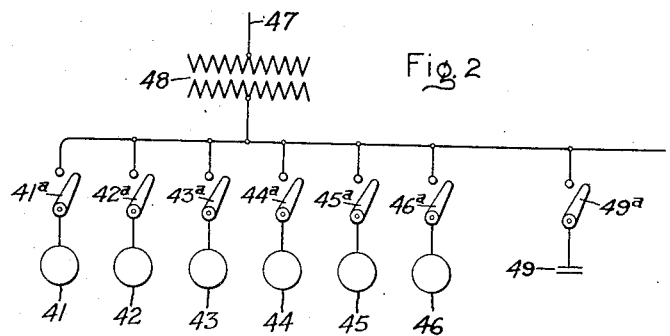
Inventor:
George E. Cassidy,
by Charles E. Tullar
His Attorney.

Patented Apr. 28, 1931

1,803,170

UNITED STATES PATENT OFFICE

GEORGE E. CASSIDY, OF ALPLAUS, NEW YORK, ASSIGNOR TO GENERAL ELECTRIC COMPANY, A CORPORATION OF NEW YORK

CONTROL SYSTEM

Application filed June 20, 1928. Serial No. 287,005.

My invention relates to control systems for synchronous motors, more particularly to control systems for starting alternating current synchronous motors, and has for its object the provision of a simple and efficient system of control for a synchronous motor whereby the current drawn from the supply source will be reduced to a minimum for a given load to be overcome in starting.

It will be understood that practically all self-starting synchronous motors are provided with an alternating current starting winding, such as a squirrel cage winding embedded in the field pole pieces. This starting winding is the principal factor in the development of torque during the starting period although some torque is added due to the hysteresis and eddy currents in the field poles themselves. If alternating electromotive forces are applied to the stator of such a machine, the field coils being deenergized, the machine will start up and will approach practically synchronous speed. If the field coils are then excited, the machine will tend to pull itself into synchronism.

It follows that the starting of a synchronous motor involves two distinct requirements, namely, starting and pull-in torques, these requirements being more or less opposed in their design influence. There has usually been a compromise between these features, the choice being governed largely by the characteristics of the load to be started and the maximum current capacity of the source. It is an inherent characteristic of the motor to draw a very large lagging current from the source during the starting period, that is, since the motor operates at this time on a very low power factor, the current drawn from the source is much larger than if the current were in phase and hence for any given current a much smaller load may be started than could be started with unity power factor. Therefore, in order to limit the current value where large starting torques are required it has been the practice to provide mechanical or magnetic clutches, or some other mechanical arrangement which would permit the synchronous motor to be brought up to speed and synchronized before the load is placed on the motor.

One aspect of my invention is the provision of a control system for a synchronous motor whereby it may be started directly connected to its load without the necessity of employing clutches etc., without detrimentally affecting the pull-in torque of the motor and without the necessity of drawing excessive currents from the source.

In carrying my invention into effect in one form thereof I provide phase modifying means interconnected with the motor during the starting period so that substantially only the power component of the motor current will actually flow from the source, whereby the motor starting torque will be greatly increased for any given current supply.

For a more complete understanding of my invention, reference should be had to the accompanying drawing in which Fig. 1 is a diagrammatic representation of a synchronous motor provided with a control system embodying my invention; while Fig. 2 illustrates diagrammatically a plurality of synchronous motors provided with the control system.

Referring to the drawing I have shown my invention in one form in connection with a synchronous motor provided with an alternating current starting winding. As shown, the synchronous motor 10 is provided with a three phase armature winding 11 on its stator member together with field windings 12 mounted on a rotor member. A suitable three phase source of alternating current supply 13 is provided for the armature winding 11, a suitable transformer 14 being interposed between the source 13 and the motor 10. It will be understood that the transformer is shown merely for the purpose of demonstrating that the motor 10 is connected to a source of supply of limited capacity. Obviously any other such means may be employed for supplying the motor 10. A suitable switch 16 is inserted in the connections leading from the transformer 14 to the motor 10, whereby the motor may be connected with the source or disconnected therefrom, as desired. A suitable source of direct current supply 17 is provided for exciting the field windings 12. A switch 18 is inserted in the circuit leading from the source 17 to the field windings so that they may be energized or deenergized, as desired.

The synchronous motor 10 is provided with a squirrel cage winding 20 on its rotor member in order that the motor may be self-started. If alternating electromotive forces are applied to the stator of the motor, the field coils not being excited, the motor will start up and will approach practically synchronous speed. If the field coils then be excited, the machine will tend to pull itself into synchronism. It will be understood that when the synchronous motor is so started it will draw a very large lagging current from the line and, therefore, since the current of the supply source is limited, the starting torque of the motor will be correspondingly limited. It will be obivous that if the current from the supply source can be brought more nearly in phase a much larger load may be started.

In order to add corrective kilovolt-amperes to the source of supply during the starting period of the motor, that is, in order to bring the current of the supply source more nearly in phase, I provide a capacitance 21 which, for purpose of illustration, may be connected in parallel with the stator winding 11 of the synchronous motor by means of the conductors 22. As shown, the capacitance comprises three condensers $21^a$, $21^b$ and $21^c$ connected in delta relation. A suitable switch 23 is interposed in these connections and is shown mechanically connected to the switch 16 so that when the switch 16 is operated to connect the synchronous motor stator winding to the supply source, the capacitance 21 will likewise be connected to the supply source and in parallel with the stator winding. It will be understood that the switches 16 and 23 may be independently operated or may be electrically interlocked, the mechanical connection shown being merely for purpose of illustration. It will be understood that the capacitance 21 will draw from the source a current which leads the applied voltage by approximately 90°. Consequently by using a capacitance of suitable proportions, the leading current taken by the capacitance may be substantially equal to the wattless lagging component of the motor at a given load, whereby approximately only the power component of the motor current will actually flow from the source at that load. It will be observed therefore, that for any given supply current, it will be possible to start a much greater load since this entire current represents the power component of the motor.

When is is desired to start the synchronous motor, the stator winding 11 will be connected to the supply source 13 by means of the switch 16, the switch 18 being open so that the field coils 12 of the machine are not excited. At the same time that the stator winding 11 is connected to the source 13 the capacitance 21 will likewise be connected to the source 13 because of the mechanical interlock between the switches 16 and 23. The capacitance 21 will therefore be electrically connected in parallel with the stator winding 11 and this electrical connection will be maintained until the motor has been brought up practically to its synchronous speed. The capacitance 21 will then be disconnected by moving the switch 16 to the position indicated by dotted lines in Fig. 1, and the field coils 12 of the machine will then be excited by closing switch 18. The motor 10 will then pull itself into synchronism. It will be understood that after the motor has been synchronized, it will be unnecessary to employ the capacitance 21 since the power factor of the synchronous motor itself is very high when running at its synchronous speed.

Fig. 2 illustrates diagrammatically the manner in which a single capacitance may be employed to start a plurality of synchronous motors, each of which is provided with a squirrel cage starting winding. As shown, the motors 41, 42, etc. are provided with switches $41^a$, $42^a$, etc. respectively, whereby they may be connected to the supply source 47 through a suitable transformer 48. As shown, a single capacitance 49 may be electrically connected to the supply source 47 in parallel with any one of the motors by means of its switch $49^a$. Thus, should it be desired to start the motor 41 it is simply necessary to connect the motor 41 and the capacitance 49 to the supply source 47 until the motor has been brought up to its synchronous speed, after which the capacitance 49 will be disconnected from the source. Should it be desired to start any of the remaining motors 42, 43, etc. the capacitance 49 will likewise be connected to the source simultaneously with the motor to be started, after which the capacitance will be disconnected from the source.

Although I have shown the capacitance arranged to be connected in parallel with the synchronous motor during the starting period, it will be obvious that the capacitance may be connected in series, since in either case the power factor of the source will be greatly improved.

It will be observed that the capacitance employed to start the synchronous motor may be much smaller than if the capacitance were employed continuously to improve the power factor of the source since it is used for a very small interval of time, that is, the interval necessary to bring the synchronous motor up to its synchronous speed. As a result the synchronous motor may be very conveniently and economically started directly connected to its load, the use of mechanical or magnetic clutches or other such devices being entirely eliminated.

It will be further observed that the motor may be designed so as to have a very large pull-in torque without detrimentally affecting the starting torque of the motor. This large pull-in torque is very essential when the motor is started directly connected with its loads.

While I have described my invention as embodied in concrete form and as operating in a specific manner in accordance with the provisions of the patent statutes, it should be understood that I do not limit my invention thereto since various modifications thereof will suggest themselves to those skilled in the art without departing from the spirit of my invention the scope of which is set forth in the annexed claims.

What I claim as new and desire to secure by Letters Patent of the United States, is:

1. The combination with an alternating current synchronous machine provided with an alternating current starting winding, of a source of alternating current supply for said machine, phase regulating means, electrical connections between said machine and said source of supply and said phase regulating means, respectively, and switching means for simultaneously connecting said machine with said supply source and said phase regulating means and for thereafter disconnecting said phase regulating means while maintaining the connections between said machine and said supply source.

2. The combination with a self-starting synchronous motor provided with an alternating current starting winding, of a source of alternating current supply for said motor, means for improving the power factor of said source during the starting period comprising a condenser and switching mechanism for simultaneously connecting said motor with said supply source and with said condenser, and for thereafter disconnecting said condenser while maintaining the connections between said motor and said supply source.

3. The combination with an alternating current synchronous motor provided with an alternating current starting winding, of a source of alternating current supply for said synchronous motor, phase regulating means, electrical connections between the stator winding of said motor and said supply source and said phase regulating means, respectively, and switching mechanism for simultaneously connecting said stator winding with said supply source and said phase regulating means and for thereafter disconnecting said phase regulating means while maintaining the connections between said stator winding and said supply source.

4. The combination with an alternating current synchronous motor provided with a squirrel cage winding, of a source of alternating current supply for said synchronous motor, a capacitance, electrical connections between the stator winding of said motor and said supply source and said capacitance respectively, a separate control switch in each of said electrical connections, and interlocking means between said switches so that the stator winding may be connected simultaneously with its supply source and with said capacitance, and said capacitance may be disconnected while the connections between the stator winding and its supply source are maintained.

In witness whereof, I have hereunto set my hand this 19th day of June, 1928.

GEORGE E. CASSIDY.